Patented May 20, 1930

1,759,268

UNITED STATES PATENT OFFICE

ALWIN MITTASCH, OF LUDWIGSHAFEN-ON-THE-RHINE, AND CARL MÜLLER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF IRON CARBONYL

No Drawing. Application filed January 29, 1925, Serial No. 5,619, and in Germany February 1, 1924.

It has repeatedly been stated in the literature bearing on the subject that in the preparation of iron carbonyl great difficulties are encountered even when working on a laboratory scale and when comparatively small amounts are to be prepared.

We have now discovered that iron carbonyl compounds can be satisfactorily manufactured on an industrial scale by working in the following manner. Carbon monoxid, or gas mixtures rich in carbon monoxid, are passed over metallic iron which has been prepared by carefully reducing oxides of iron at comparatively moderate temperatures, and for the reaction with the carbon monoxid a high pressure (about 50 atmospheres or more) is employed with temperatures varying between about 100 degrees and 200 degrees centigrade and a high speed of the gas current. Such a speed of the gases is employed, according to this invention, as will prevent either completely or to a substantial amount the deposition of iron carbonyl on the iron which deposition would be obnoxious to the progress of the reaction. The speed of the gas current has to be adapted to suit the pressure, temperature and activity and quantity of the iron employed in each particular case. By observing the said conditions a continuous formation of iron carbonyl is rendered possible and consequently the yields are very satisfactory. For example, the process is carried out in such a manner that the gases leaving the reaction vessel contain about 8 per cent or less, by volume, of iron carbonyl calculated as iron penta-carbonyl $Fe(CO)_5$. In order to avoid decomposition of the iron carbonyl it is advisable to cool it below about 140 degrees centigrade before releasing the pressure.

As an example of the process according to this invention carbon monoxid is passed at 180 degrees centigrade, at a pressure of from 100 to 150 atmospheres and at a speed corresponding to 500 litres per hour (calculated on normal conditions) over 500 grammes of reduced iron which prior to the reaction had been again heated for a short time in a current of hydrogen to 500 degrees centigrade. The gas leaving the reaction vessel contains about 2 per cent, by volume, of iron carbonyl vapor and this can be condensed by cooling which is preferably done without releasing the pressure. Means for absorption, for example highly porous coal or charcoal may also be employed. The carbon monoxid not consumed is preferably again introduced into the reaction vessel and is most suitably circulated without releasing the pressure and while adding as much fresh carbon monoxid as has been converted into iron carbonyl until it becomes necessary to supply a fresh charge of reduced iron or to renew the circulating gas owing to impurities having accumulated. The residual gas may be utilized in a suitable way, for example for heating purposes.

Instead of carbon monoxid, gases rich in carbon monoxid may also be used, preferably mixtures containing both carbon monoxid and hydrogen which are readily and cheaply available as for example ordinary water gas or mixtures even richer in hydrogen. With such gases it will become necessary to withdraw the reaction gases and to introduce continuously a fresh supply of gas mixture. In these cases it will be necessary to cool the reaction gases before releasing the pressure, to about 140 degrees centigrade or less in order to avoid decomposition of the iron carbonyl formed which would take place with the hot gases brought under atmospheric pressure. Cooling is preferably carried so far as to separate the chief amount of the iron carbonyl.

The activity of the iron can be increased by adding certain bodies such as oxids of aluminum, bismuth, nickel and other bodies in a finely divided condition, for example by simultaneously precipitating such oxids with iron oxids from suitable salt mixtures. Certain gases or vapors when added to the carbon monoxid or the gas mixture containing same also favorably influence the reaction, as for example water vapor or mercury vapor. When the activity of the iron is increased, the speed of the current of the carbon monoxid must also be increased or else the deposition of liquid carbonyl on the iron must be counteracted by other means, for example by raising the temperature.

The metallic iron may be prepared from iron oxid or suitable iron salts such as carbonate or oxalate. Very suitable starting materials are roasted pyrites and other materials forming stable lumps.

The following example will serve to more fully explain a further mode of carrying out the invention, but the invention is not limited to the specific examples.

Roasted pyrites containing about 60 per cent of iron, 3,5 per cent of sulfur and 1 per cent of copper, is freed from small-sized matter and is filled, in pieces of from pea to walnut size, into a vertical cylinder, capable of resisting high pressure, lined with copper and provided with a perforated false bottom and a suitable heating device. The oxid mass is first treated with a current of hydrogen at ordinary pressure and the temperature raised to 500 degrees centigrade until reduction is complete whereupon the temperature is lowered to about 200 degrees centigrade and carbon monoxid is passed through at a pressure of 200 atmospheres. The speed of the gas current is suitably controlled to produce a reaction gas with no more than about 6 per cent, by volume, of iron carbonyl, calculated as $Fe(CO)_5$. The gas leaving the furnace is led through one or more cooled receivers without releasing the pressure. The large mass of iron carbonyl condenses in said receivers and the remainder may be absorbed in active carbon or similar means. The residual gas is conveyed back into the high pressure furnace. The iron mass contained therein does not break asunder and accordingly there is no clogging in the furnace or in the pipings.

When the formation of iron carbonyl diminishes considerably, about two thirds or three quarters of the iron mass will be consumed and the mass is then replenished, or it may be found proper to apply a short reduction step to the remainder of the mass whereupon a rapid formation of carbonyl will again take place.

Roasted pyrites may also be reduced in a separate reduction furnace; in such case it must be reduced in a hydrogen atmosphere which thereafter is replaced by carbon dioxid in which the iron loses its pyrophoric property without becoming less suitable for the production of carbonyl. It can be transferred without injury into the high pressure furnace where it is subjected to the action of carbon monoxid.

We claim:

1. The process of manufacturing liquid iron carbonyl which comprises passing over finely divided iron a gas containing carbon monoxid at a high pressure and an elevated temperature and with so great a speed that the iron carbonyl formed is substantially carried away with the gas current.

2. The process of manufacturing iron carbonyl which comprises passing over a metallic iron a gas containing carbon monoxid at a high pressure and an elevated temperature and with sufficient speed to carry the iron carbonyl formed away with the gases and reducing the temperature of the gases after the reaction to less than about 140 degrees centigrade before releasing the pressure.

3. The process of manufacturing liquid iron carbonyl which comprises passing over metallic iron prepared by reducing roasted pyrites a gas containing carbon monoxid at a high pressure and a temperature between about 100 degrees and 200 degrees centigrade and with so great a speed that the iron carbonyl formed is substantially carried away with the gas current.

4. The process of manufacturing liquid iron carbonyl which comprises passing over metallic iron a gas containing carbon monoxid at a high pressure and an elevated temperature and with so great a speed as to produce a gas mixture containing less than about 8 per cent, by volume, of iron carbonyl.

5. The process of manufacturing iron carbonyl which comprises passing over metallic iron a gas containing carbon monoxid at a high pressure and a temperature ranging between about 100 and 200 degrees centigrade and with so great a speed as to produce a gas mixture containing less than about 8 per cent, by volume, of iron carbonyl and separating the latter from the reaction gases while maintaining the pressure.

6. The process of producing iron carbonyl which comprises passing over metallic iron a gas containing carbon monoxid at an elevated pressure and temperature and at a high speed so as to produce a gas mixture containing less than about 8 per cent, by volume, of iron carbonyl, separating the latter from the gases, returning the residual gases to the metallic iron, the whole process being carried out in a circulating system without releasing the pressure.

7. The process of producing iron carbonyl which comprises passing over a mass comprising metallic iron and a catalytic substance, a gas containing carbon monoxid at an elevated pressure and temperature and at a high speed so as to carry away substantially all of the carbonyl formed with the gases.

8. The process of producing iron carbonyl which comprises passing over metallic iron a gas containing carbon monoxid and a substance favorably influencing the action of iron, at a high pressure and between about 100 degrees and 200 degrees centigrade and with a high speed to substantially avoid the deposition of liquid iron carbonyl on the iron mass.

9. The process of manufacturing iron carbonyl which comprises passing over metallic iron a gas containing carbon monoxid at a pressure of at least 50 atmospheres and at a temperature between about 100° and 200° C. and with so great a speed that the iron carbonyl formed is substantially carried away with the gas current.

In testimony whereof we have hereunto set our hands.

ALWIN MITTASCH.
CARL MÜLLER.